United States Patent
Wang et al.

(10) Patent No.: US 11,137,411 B2
(45) Date of Patent: Oct. 5, 2021

(54) SAMPLE ANALYZER

(71) Applicant: SHENZHEN MINDRAY BIO-MEDICAL ELECTRONICS CO., LTD., Shenzhen (CN)

(72) Inventors: Zhihong Wang, Shenzhen (CN); Fating She, Shenzhen (CN); Peng Zhou, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 313 days.

(21) Appl. No.: 15/851,470

(22) Filed: Dec. 21, 2017

(65) Prior Publication Data

US 2018/0113143 A1    Apr. 26, 2018

Related U.S. Application Data

(63) Continuation of application No. PCT/CN2015/082002, filed on Jun. 22, 2015.

(51) Int. Cl.
    *G01N 35/04* (2006.01)
    *G01N 35/10* (2006.01)

(52) U.S. Cl.
    CPC .......... *G01N 35/04* (2013.01); *G01N 35/109* (2013.01); *G01N 35/1083* (2013.01); *G01N 2035/0415* (2013.01); *G01N 2035/0418* (2013.01)

(58) Field of Classification Search
    CPC .......... G01N 35/1011; G01N 35/1081; G01N 35/109; G01N 35/04; G01N 2035/0415; G01N 2035/0412; G01N 2035/0413
    See application file for complete search history.

(56) References Cited

U.S. PATENT DOCUMENTS 3,985,507 A * 10/1976 Litz .................... B65G 1/10
                                              422/65
5,735,387 A * 4/1998 Polaniec ............ G01N 35/04
                                              198/465.1
(Continued)

FOREIGN PATENT DOCUMENTS

CN      103884857        6/2014
CN      104215783 A     12/2014
(Continued)

OTHER PUBLICATIONS

English Translation of CN 103884857, Jun. 2014.*

*Primary Examiner* — Alexander A Mercado
(74) *Attorney, Agent, or Firm* — Kory D. Christensen (57) ABSTRACT

A sample analyzer, comprising a sample storage region, a sample-drawing channel, and a transport mechanism; the sample storage region being provided with a plurality of storage channels; the sample-drawing channel is provided with a sample-drawing position; the transport mechanism comprises an engagement slot, an actuation mechanism and a first moving mechanism; the engagement slot and the actuation mechanism are fixed on the first moving mechanism, the actuation mechanism comprises an actuator and a second moving mechanism, the actuator is drivable by at least one of the first moving mechanism and the second moving mechanism to realize the movement of the sample holder between the storage channels and the engagement slot; during sample drawing, the first moving mechanism drives the engagement slot to move to the sample-drawing channel, the actuation mechanism enables samples to pass through the sample-drawing position and to make a stop for sample drawing.

11 Claims, 7 Drawing Sheets

(56) References Cited

U.S. PATENT DOCUMENTS

| | | | | |
|---|---|---|---|---|
| 2004/0096362 | A1* | 5/2004 | Barry | B65G 47/914 |
| | | | | 422/65 |
| 2008/0022808 | A1* | 1/2008 | Owen | G01N 35/026 |
| | | | | 81/3.2 |
| 2009/0129979 | A1 | 5/2009 | Kegelman et al. | |
| 2011/0146422 | A1 | 6/2011 | Wiederin et al. | |
| 2011/0256629 | A1* | 10/2011 | Wang | G01N 35/1002 |
| | | | | 436/45 |
| 2012/0216610 | A1 | 8/2012 | Kanayama | |
| 2014/0096623 | A1* | 4/2014 | Mansfield | G01N 33/362 |
| | | | | 73/863.21 |
| 2016/0202279 | A1* | 7/2016 | Endo | G01N 35/028 |
| | | | | 73/863.01 |
| 2017/0219614 | A1* | 8/2017 | Cook | B01L 3/50851 |

FOREIGN PATENT DOCUMENTS

| | | |
|---|---|---|
| CN | 104569451 A | 4/2015 |
| CN | 204740254 U | 11/2015 |
| EP | 0563893 A2 | 10/1993 |
| EP | 0753747 A2 | 1/1997 |
| EP | 0753747 A3 | 1/1998 |
| JP | S55140155 A | 11/1980 |
| WO | WO 2012/012779 | 1/2012 |
| WO | WO 2013/034937 | 3/2013 |

\* cited by examiner

SAMPLE ANALYZER

CROSS-REFERENCE TO RELATED APPLICATIONS

This application is a continuation of Patent Cooperation Treaty Application No. PCT/CN2015/082002, titled "Sample Analyzer," filed on Jun. 22, 2015, which is incorporated herein by reference.

TECHNICAL FIELD

The present disclosure relates to a sample analyzer, and in particular to a sample analyzer with a mechanism for feeding sample holders.

BACKGROUND

At present, common techniques for transferring samples in an automated analyzer include (1) sample disc-based sample introduction methods and (2) sample holder track-based sample introduction methods. Sample discs, due to their simple structure and low cost, are widely used in medium to low-end machine models. However, in the sample disc-based transfer method, it is inconvenient for a user to load a sample at any time or unload a sample for which sample drawing has been finished at any time. Prior art solutions for track-based sample introduction have the features of complex structures, large occupied spaces, and high costs. However, such solutions allow for loading of a sample at any time or unloading of a sample for which sample-drawing has been finished at any time, thus ensuring continuous highly efficient testing for large sample sizes, and are widely used in medium to high-end analyzers.

However, for a common sample holder track-based sample introduction method, sample holders are generally transferred according to a place in order and queue up to enter a scanning position and a sample-drawing position in turn, so that emergency response speed is affected, and a sample requiring an automatic retest usually needs to be brought into a place-in region again to wait in a line, thus prolonging the time of a retest. While various structures and control methods have sought to reduce emergency response time, they have hitherto not prevented the problem of the sample needing to wait in a line again to be automatically retested.

Some conventional approaches do not serially introduce sample holders according to a place in order, and instead, the sample holders are taken from any position in a sample holder storage region via a manipulator, after a sample holder is rotated by 90 degrees, the sample holder is transferred to a scanning position and a sample-drawing position to complete corresponding operations before the sample holder is returned to the sample holder storage region again. However, this approach requires a large space, and since the sample holders need to be translated and rotated, the complexity of the mechanism increases.

SUMMARY

The present disclosure provides a sample analyzer with a mechanism for feeding sample holders in which there is no need to serially transfer the sample holders according to a place in order. Parts for sample holder transfer, information reading, and sample drawing are compact in structure, occupying a small space.

In one embodiment, a sample analyzer may include sample storage region, the sample storage region being provided with a plurality of storage channels arranged side-by-side for receiving sample holders, each sample holder being capable of receiving a plurality of sample containers. The sample analyzer may further include a transport mechanism, comprising an engagement slot for receiving the sample holder, an actuation mechanism, and a first moving mechanism for driving the engagement slot and the actuation mechanism to move along a first direction, wherein the first direction is a horizontal direction perpendicular to an axial direction of the storage channels. In one embodiment, the engagement slot and the actuation mechanism are fixed on the first moving mechanism, an axial direction of the engagement slot is parallel to the axial direction of the storage channels, the engagement slot and the actuation mechanism are alignable with any one of the storage channels by means of the first moving mechanism moving along the first direction, the actuation mechanism comprises an actuator for pushing or pulling the sample holder and a second moving mechanism for driving the actuator to move along a second direction parallel to the axial direction of the storage channel, and the actuator is drivable by at least one of the first moving mechanism and the second moving mechanism to realize the movement of the sample holder between the storage channels and the engagement slot.

The sampler analyzer may further include a sample-drawing channel, which is at least partially located on a movement route of the engagement slot and is arranged in parallel with the axial direction of the storage channels, wherein the sample-drawing channel is provided with a sample-drawing position. During sample drawing, the first moving mechanism drives the engagement slot to move to the sample-drawing channel, the actuation mechanism enables one or more samples on the sample holder to pass through the sample-drawing position and to make a stop at the sample-drawing position for the purpose of sample drawing.

DETAILED DESCRIPTION

In one embodiment, a sample analyzer may operate according to the following process: sample introduction, sample drawing, reagent drawing, reaction, and after the reaction, processing with regard to different analysis items.

Figure 1:
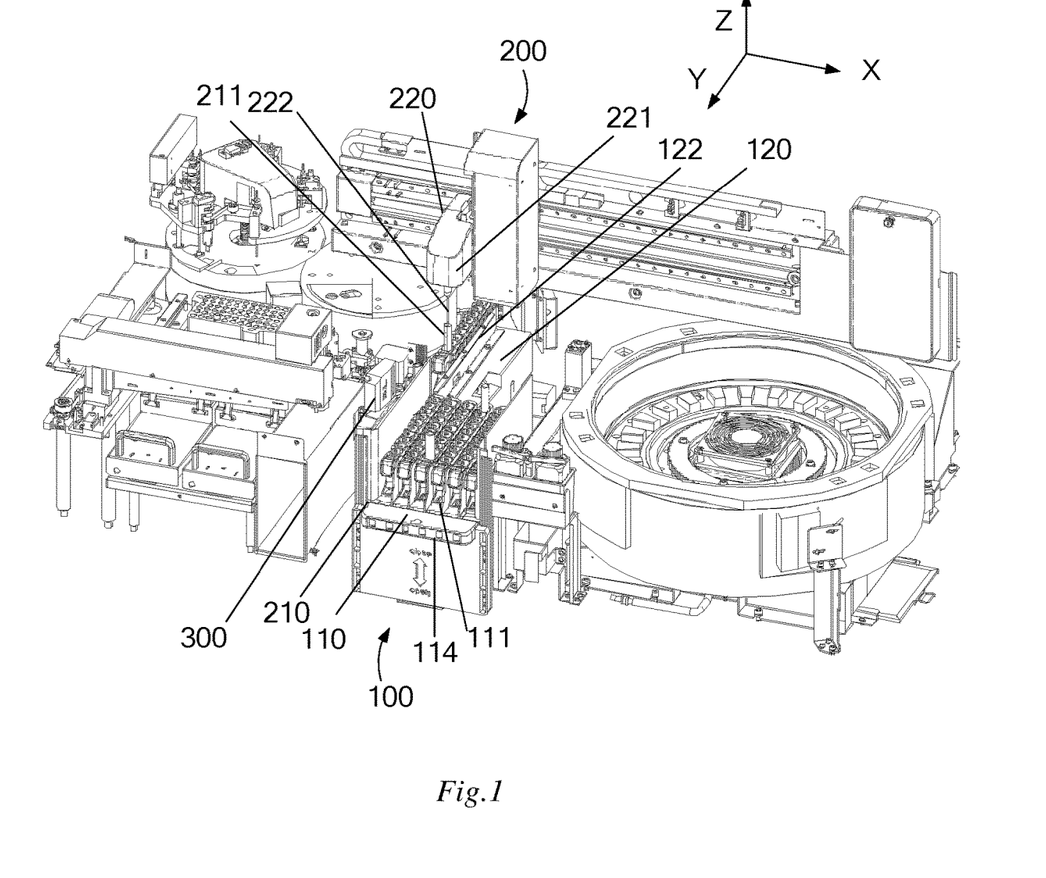
FIG. 1 is an overall structural schematic diagram of a sample analyzer.

In this embodiment, as shown in FIG. 1, the sample analyzer includes a sample dispatcher module 100, a sample-drawing module 200, and an information reader 300, where the sample dispatcher module 100 may be used for realizing transporting a designated sample holder to a designated position, and executing a designated operation. The sample dispatcher module 100 includes a sample holder storage region 110 and a transport mechanism 120, and the sample-drawing module 200 includes a sample-drawing channel 210 and a sample-drawing mechanism 220.

Figure 2:
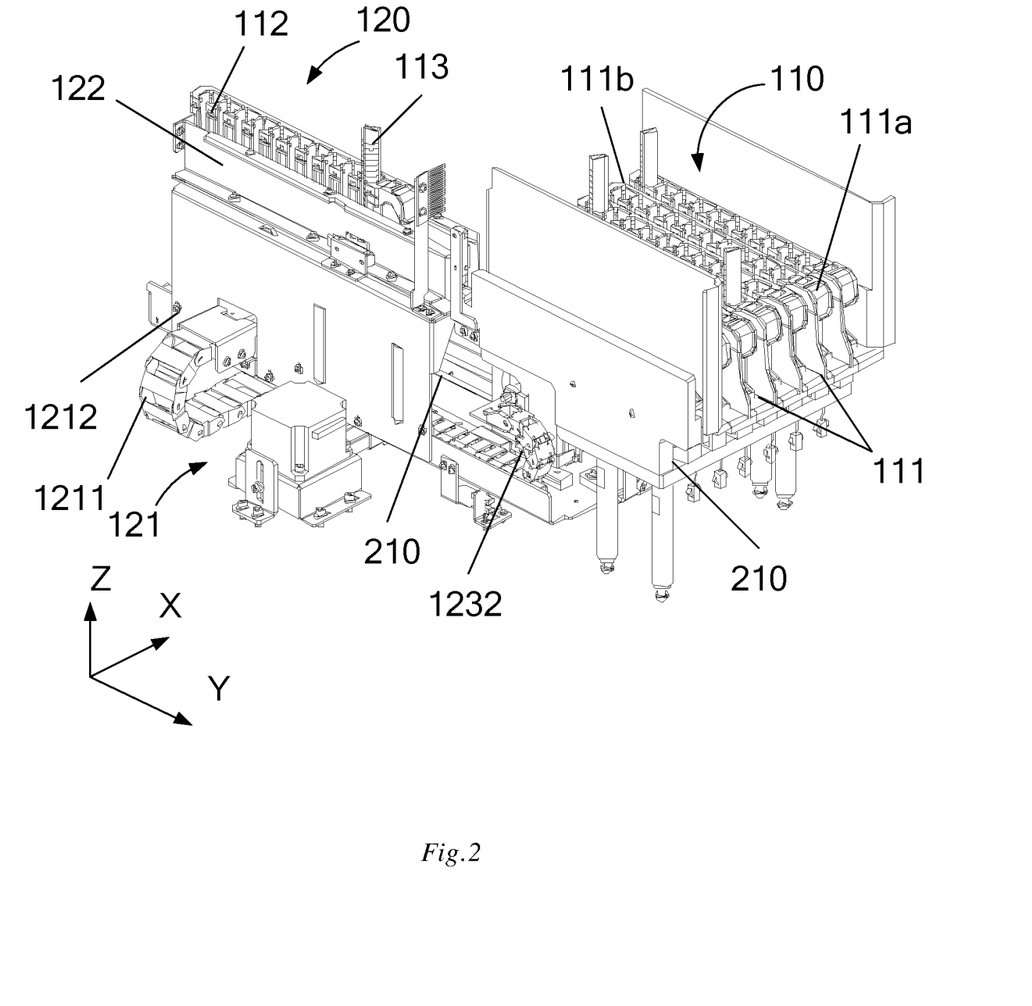
FIG. 2 is a partial structural schematic diagram of a sample analyzer.

As shown in FIGS. 1 and 2, the sample holder storage region 110 can be implemented via a platform, and the sample holder storage region 110 may be provided with a plurality of storage channels 111 arranged side by side. In some embodiments, a plurality of storage channels 111 also arranged in parallel. Adjacent storage channels may be spaced apart without interfering with each other, and the storage channel 111 may be used for receiving a sample holder 112, for example. One sample holder can be received in one storage channel. Each sample holder 112 may be provided with a plurality of test tube positions and may be capable of bearing a plurality of test tubes 113, and the test tubes 113 may be used for holding samples.

When the sample on the sample holder needs to be analyzed, a user can place the sample holder in one storage channel 111, and when the samples on the sample holder have been analyzed, the user can remove the sample holder from the storage channel 111. The storage channel 111 may be provided with two ends. For convenience of explanation, it is defined that the end where the user executes loading and unloading of the sample holder is a user proximal end 111a, and the end where the transport mechanism 120 executes loading and unloading of the sample holder is a slot proximal end 111b.

In some embodiments, in order to facilitate recognition of a current state of each storage channel, a sensor may be mounted in each storage channel, for recognizing whether the sample holder may be arranged in the storage channel. An indicator light 114 may be mounted on the front side of each storage channel 111, as shown in FIG. 1. The sample analyzer controls, according to the state of the sensor and a test state of each storage channel, different display states of the indicator lights 114, and the user may expediently recognize a current state of each storage channel via the display state of the indicator lights 114. For example, the indicator light may include four states—turning off, a green indicator turning on, a yellow indicator turning on, and the green indicator flashing—respectively indicating the storage channel being idle, the sample holder being loaded in the storage channel (namely, the test is not started yet), the storage channel being in operation (including steps such as waiting to be tested after starting a test, taking away the sample holder by the transport mechanism for test, and setting automatic retest to wait for a test result), and the test for the sample holder in the storage channel being finished. When the indicator light indicates that the test for the sample holder in the storage channel has been finished, the user can remove the sample holder from the storage channel.

As shown in FIG. 2, the transport mechanism 120 may be arranged in the front region of the slot proximal end 111b of the storage channel 111, and includes a first moving mechanism 121, an engagement slot 122 and an actuation mechanism. The first moving mechanism 121 may be used for moving along a first direction (an X direction shown in the figure) perpendicular to an axial direction of the storage channel on the horizontal plane. In some embodiments, the first moving mechanism 121 includes a transmission chain 1211 capable of transmission along the X direction and a base 1212, where the base 1212 may be fixed on the transmission chain 1211. The engagement slot 122 may be used for accommodating the sample holder and may be fixed on the first moving mechanism 121, and the axial direction of the engagement slot 122 after being mounted may be consistent with the axial direction of the storage channels. The actuation mechanism may be also fixed on the first moving mechanism 121. The engagement slot 122 and the actuation mechanism may be both fixed on the base 1212. When the transmission chain 1211 performs transmission, the base 1212 can follow the transmission chain 1211 to move leftwards and rightwards in the X direction, so as to drive the engagement slot 122 and the actuation mechanism to move leftwards and rightwards in the X direction, so that the engagement slot 122 and the actuation mechanism can align with any one of the storage channels 111 in the sample storage region by means of moving leftwards and rightwards.

Figure 3:
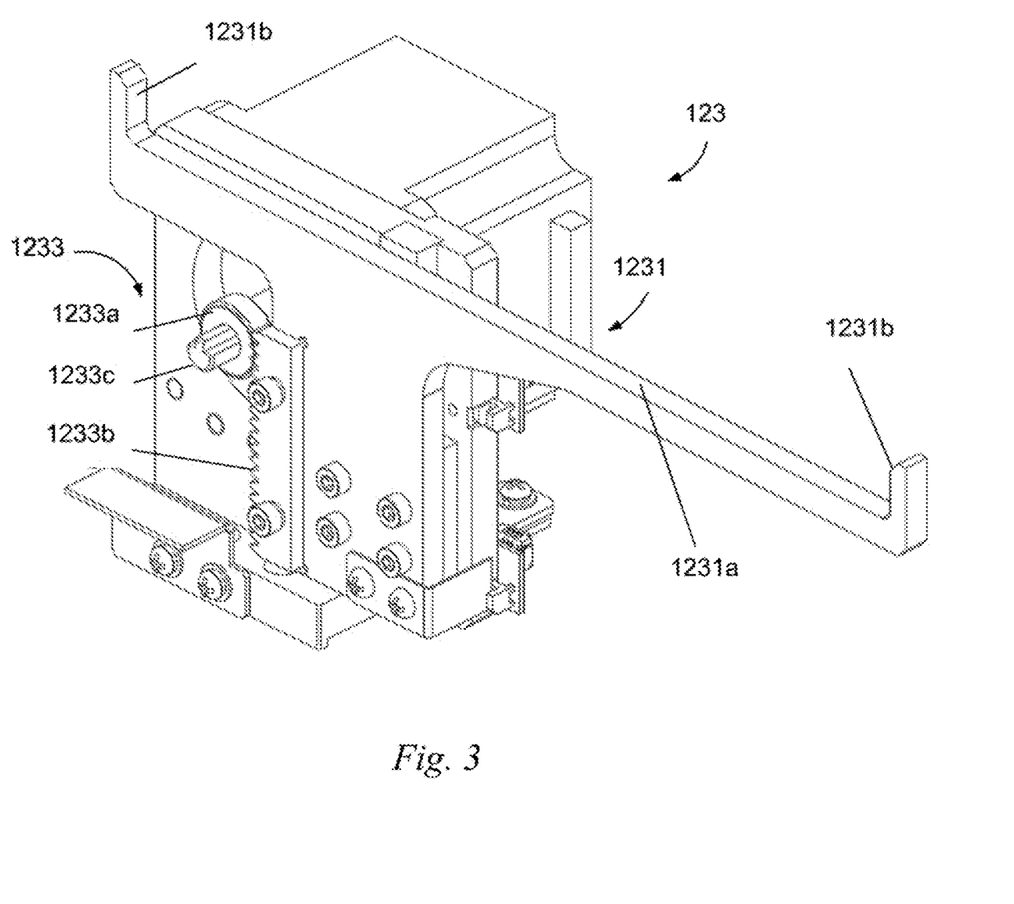
FIG. 3 is a structural schematic diagram of an actuation mechanism.

The actuation mechanism may be used for grasping the sample holder when making contact with the sample holder, and when the actuation mechanism moves, the sample holder can be driven to move together. With reference to FIGS. 2 and 3, in this embodiment, the actuation mechanism 123 is located below the engagement slot and includes an actuator 1231 for pushing the sample holder and a second moving mechanism 1232, where the second moving mechanism can be a second transmission chain. The second moving mechanism may be used for driving the actuator to move forwards and backwards along a second direction (a Y direction shown in FIG. 2) parallel to the axial direction of the storage channel. When the engagement slot aligns with one storage channel under the drive of the first moving mechanism, the actuator also aligns with the storage channel, and then the second moving mechanism may drive the actuator to move forwards and backwards along the Y direction, so that the sample holder in the storage channel is moved into the engagement slot, or the sample holder in the engagement slot may be pushed into the storage channel.

In the embodiment shown in FIG. 3, the actuation mechanism 123 further includes a third moving mechanism 1233, the actuator 1231 may be fixed on the third moving mechanism 1233, and the third moving mechanism 1233 may drive the actuator 1231 to ascend and descend. For example, the third moving mechanism 1233 may include a gear 1233a, a rack 1233b and an electric motor 1233c, where a gear meshing mechanism may drive the gear 1233a to rotate via the electric motor 1233c, the gear 1233a may mesh with the rack 1233b to move the rack 1233b, and the actuator 1231 may be fixed on the rack 1233b, so that the rack 1233b can drive the actuator 1231 to move up and down. In addition, the third moving mechanism 1233 and the actuator 1231 may be fixed together on the second moving mechanism 1232 and driven by the second moving mechanism 1232 to move forwards and backwards along the Y direction. The actuator 1231 includes a long cross arm 1231a and a short vertical arm 1231b. The vertical arm 1231b may be arranged on two sides of the cross arm 1231a. The length of the cross arm 1231a may be slightly greater than the length of the sample holder. The actuator 1231 can be moved to the bottom of the sample holder under the drive of the second moving mechanism. The third moving mechanism 1233 may drive the actuator 1231 to ascend, so that the cross arm 1231a abuts against the bottom of the sample holder. The vertical arm 1231b may be used for getting contact, during movement, with two side faces of the bottom of the sample holder, so that the actuator 1231 can push or pull the sample holder under the drive of the second moving mechanism.

In another embodiment, the actuator 1231 can also grasp the sample holder by means of magnetic attraction, or abut against the bottom of the sample holder by means of elastic deformation. In the two manners, the actuator may not have a third moving mechanism for driving the actuator to ascend and descend; moreover, the structure of the actuator can also be changed in terms of adaptability.

In another embodiment, the above-mentioned transmission chain can be replaced with a guide rail or other moving means.

A sample-drawing mechanism 220 may include a moving mechanism 221 and a sample dispensing needle 222, where the sample dispensing needle 222 may be mounted on the moving mechanism 221, the moving mechanism 221 may be used for moving the sample dispensing needle 222 to a sample-drawing position where a sample may be located, and the sample dispensing needle 222 executes a sample-drawing operation on the sample.

Figure 4:
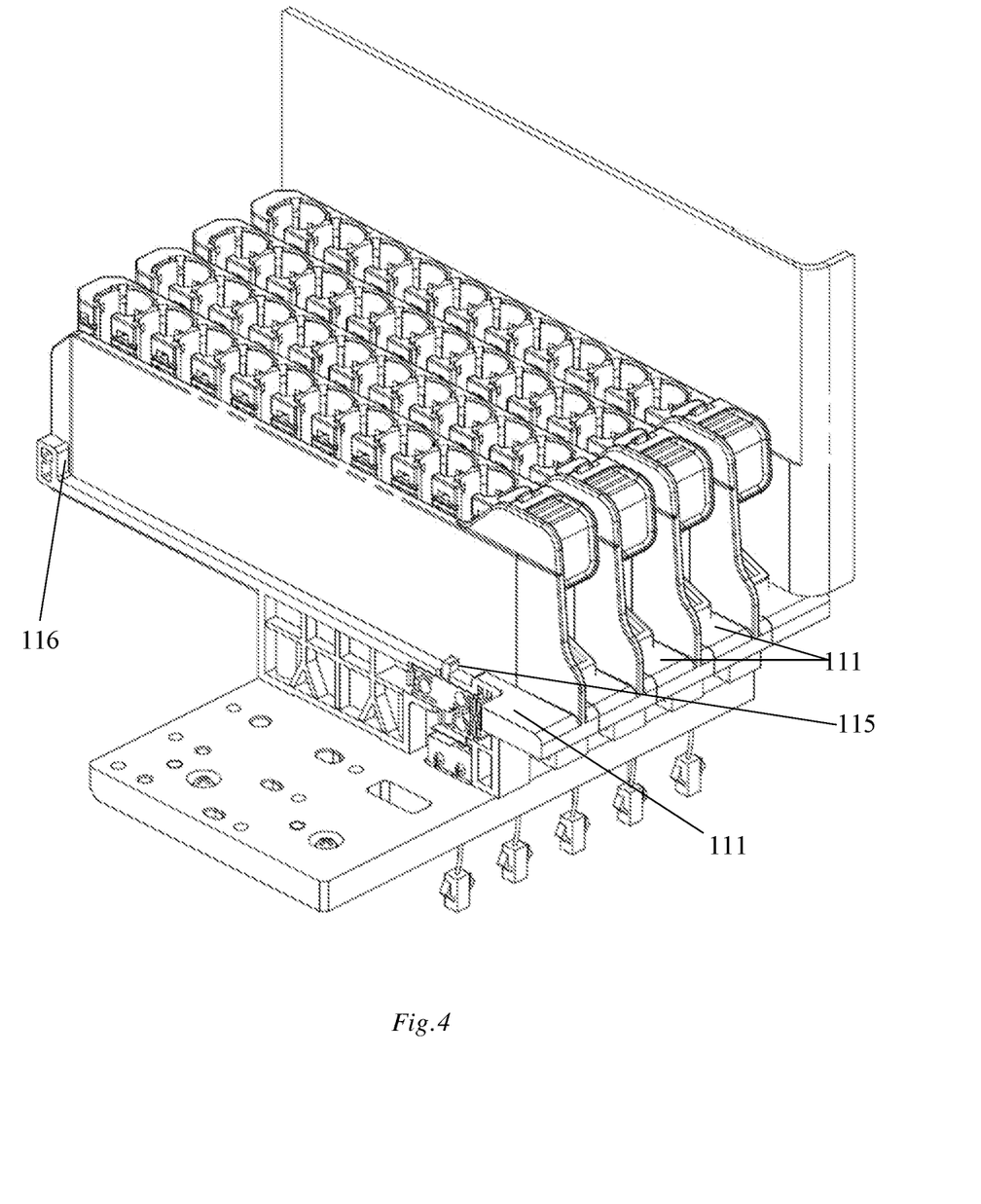
FIG. 4 is a structural schematic diagram of stop members.

A sample-drawing channel 210 may be used for accommodating the sample holder and provides a sample-drawing position for the samples, where the sample-drawing position refers to a position where the drawn sample is located when the sample dispensing needle executes the sample-drawing operation. The sample-drawing channel 210 may be located within a route of the engagement slot 122 moving in the X direction, and may be arranged in parallel with the axial direction of the storage channel 111. In this embodiment, the sample-drawing channel 210 is a region capable of accommodating the sample holder, and in a sample-drawing step, the first moving mechanism 121 may drive the engagement slot 122 to move to the sample-drawing channel 210 for the sample-drawing operation. In this embodiment, the sample-drawing channel 210 may be only provided with one sample-drawing position 211, the samples on the sample holder are successively transferred to the sample-drawing position 211 for sample drawing. In order to providing the sample holder with enough movement space in the sample-drawing channel 210, the length of the sample-drawing channel may be at least about twice the length of the sample holder. In some embodiments, the sample-drawing channel may be arranged in parallel and side by side with the storage channel and extends to an engagement slot movement area, and the sample-drawing position 211 may be located in a middle section of the sample-drawing channel 210. In some embodiments, the sample-drawing channel may be arranged on a position close to an outermost storage channel, as shown in FIGS. 2 and 4, while in other embodiments, the sample-drawing channel may be arranged in a middle channel between the plurality of storage channels. In some embodiments, the sample-drawing channel may not be arranged side by side with the storage channel. Otherwise, the sample-drawing channel may extend from an area where the engagement slot moves to an area far from the storage channel.

Before the analyzer performs sample drawing, sample information may to be acquired. The information reader 300 may be used for acquiring the sample information. The information reader 300 may be a bar code scanner, or an RF card reader, or an IC card reader, which may be arranged in a transfer path along which the sample holder may be taken from the storage channel to the sample-drawing position for sample drawing. The information reader 300 may perform an information reading operation on the samples that pass through the place where the information reader 300 is located. In this embodiment, the information reader 300 is a bar code scanner, which may be arranged along the sample-drawing channel and may be arranged on a middle region of a certain side of the sample-drawing channel 210, e.g., the reader can be arranged adjacent to and side by side with the sample-drawing position or at the same position as the sample-drawing position. After the first moving mechanism 121 may drive the engagement slot 122 to move to the sample-drawing channel 210, the actuation mechanism may move the sample holder, such that the sample holder is removed from the engagement slot 122 and successively advances along the sample-drawing channel 210 towards a position where the information reader 300 may be located, when the sample reaches the position of the information reader 300, sample information may be acquired by means of bar scanning. After all the samples on the sample holder pass through the position of the information reader, the actuation mechanism may drive the sample holder to move in a reverse direction, and the samples on the sample holder successively pass through the sample-drawing position 211 and make a stop at the sample-drawing position for the purpose of sample drawing.

Figure 6:
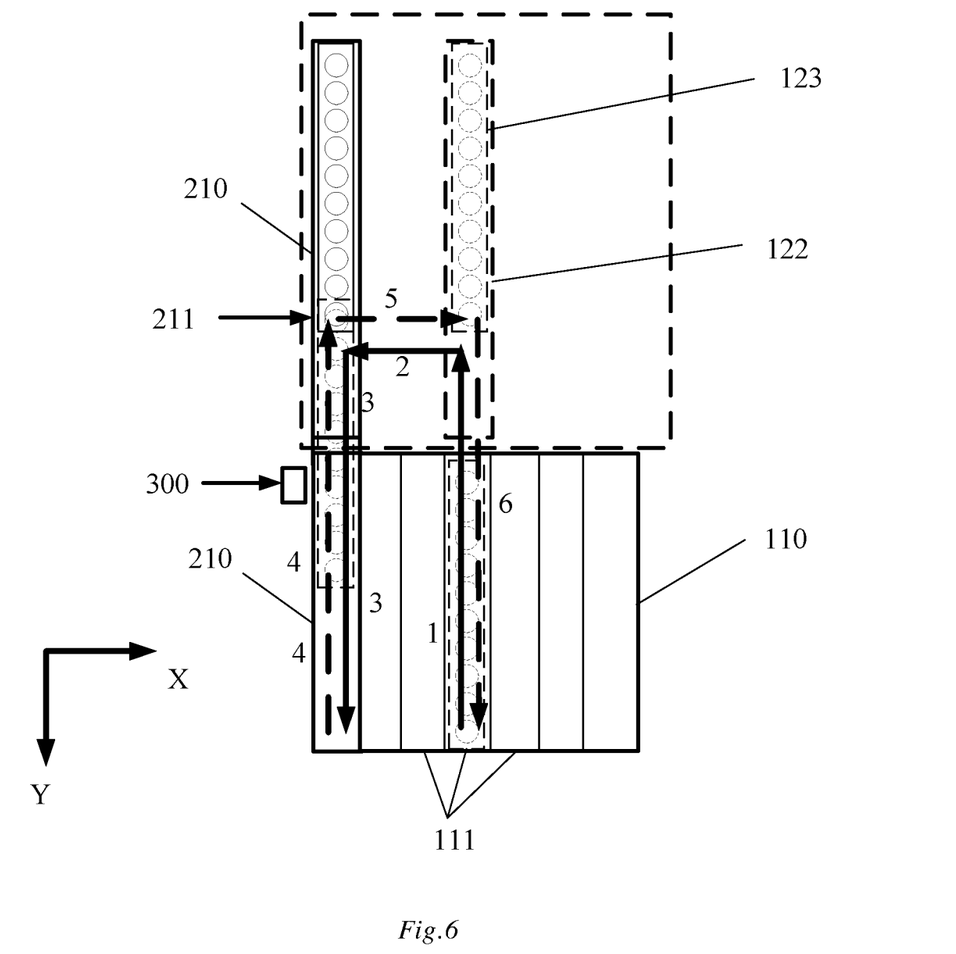
FIG. 6 is a diagram of a movement route of a sample holder.

An operating procedure of the present embodiment is shown in FIG. 6, comprising the following blocks.

The sample holder may move along a path 1. The first moving mechanism may move along the X direction, so that the engagement slot 122 aligns with the predetermined storage channel 111. The actuator may move towards the sample holder in the storage channel along the Y direction, capture the sample holder after reaching the sample holder, and then move in a reverse direction towards the engagement slot 122 (as shown by bold dotted lines in FIG. 6), such that the sample holder may be moved to an initial position 123 (as shown by fine dotted lines in FIG. 6) of the sample holder in the engagement slot.

The sample holder may move along a path 2. The first moving mechanism may drive the engagement slot in which the sample holder is placed to move along the X direction so as to enter the sample-drawing channel.

The sample holder may move along a path 3. The actuation mechanism pushes the sample holder to align a sample holder bar code with a scanning window of the scanner 300 for scanning the sample holder bar code. Then the actuation mechanism continues to push the sample holder to move out of the engagement slot, such that the samples on the sample holder successively advance according to tube positions, and the samples are successively aligned with the scanning window to complete the scanning of the bar code of the sample holder and the bar codes of 10 samples.

The sample holder may move along a path 4. The actuation mechanism may push the sample holder to move in the reverse direction, such that the sample holder may move into the engagement slot. The samples to be tested successively stop at the sample-drawing position, and at the same time, the sample dispensing needle may move to the sample-drawing position to execute the sample-drawing operation on the samples until sample-drawing operation of all the samples is finished.

The sample holder may move along a path 5. The first moving mechanism may move along the X direction, so that the engagement slot aligns with the predetermined storage channel.

The sample holder may move along a path 6. The actuation mechanism may move along the Y direction to transfer the sample holder to a position above the storage channel.

In this embodiment, there may be a plurality of storage channels arranged side by side in parallel and isolated from each other in a sample storage region. The first moving mechanism can align with any one of the storage channels according to instructions, so as to transport the sample holder in the storage channel to the sample-drawing position. Therefore, there is no need to transfer in a serial introduction manner according to the place-in order of the sample holders. In other words, each storage channel may be set as an emergency (priority) channel, thus reducing the response time of emergency and retest. During a test process, if the emergency (priority) channel applies for a test, a control software program temporarily returns the sample holder in the current test to a corresponding storage channel, and transports an emergency sample, which is located in an emergency sample holder, to the sample-drawing position for sample drawing. After an emergency sample-drawing is completed, the emergency sample holder may be returned to the corresponding storage channel, after which the sample holder to be tested which is interrupted may be transferred to the sample-drawing position again to continue subsequent tests.

In this embodiment, the sample-drawing position only has one position coordinate, and a cooperative design is adopted between the sample-drawing channel and the engagement slot as well as between the storage channel and the engagement slot, such that the transport mechanism needs to perform two-dimensional movement to transfer the sample to the sample-drawing position for sample drawing, which not only optimizes an overall spatial layout of the sample analyzer, but also simplifies the design of the structure of the sample-drawing mechanism, since it is necessary to move the sample-drawing mechanism to the same sample-drawing position for the sample-drawing operation.

In other embodiments, the information reader can also be arranged along the engagement slot, for example, be arranged at an end, close to the storage channel, of the engagement slot for reading sample information when the actuation mechanism may drive the sample holder to move into the engagement slot.

Figure 5:
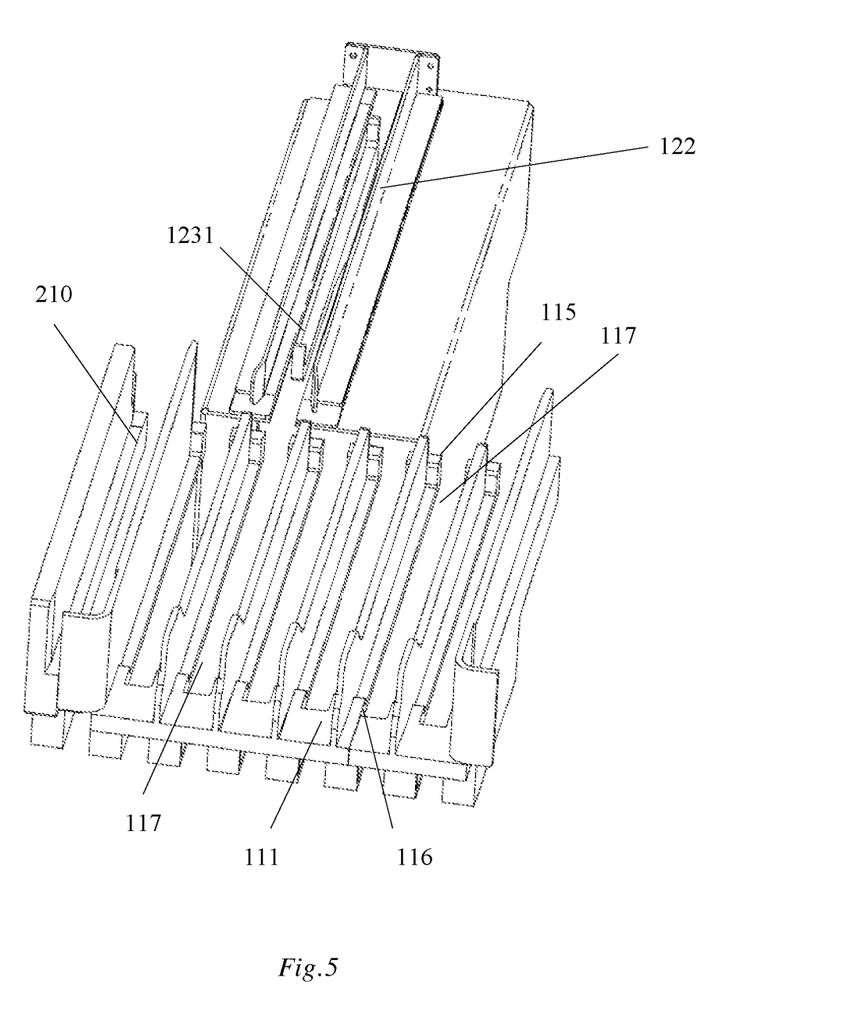
FIG. 5 is a stereoscopic schematic diagram of a storage channel and an engagement slot viewed from another angle.

In other embodiments, in order to prevent the sample holder from protruding out of the storage channel 111 when a user places in a sample holder, the storage channel may be further provided with stop members, as shown in FIGS. 4 and 5. The stop members 115 and 116 may be respectively arranged at two ends of the storage channel for position restriction when the sample holder is placed into the storage channel, and are capable of preventing the sample holder in the storage channel from protruding out of the storage channel. In this embodiment, the front stop member 115 and the rear stop member 116 are respectively steps arranged at two ends of each storage channel. The middle of each step and the middle of each storage channel may be provided with an opening 117 through which the actuator can pass. The third moving mechanism may also drive the actuator to ascend and descend when the actuator raises the sample holder to pass through the step. When the sample holder needs to enter the storage channel from the engagement slot or enter the engagement slot from the storage channel, the third moving mechanism may drive the actuator to ascend, such that the cross arm 1231a of the actuator raises the sample holder to pass through the step. After the sample holder enters the engagement slot or the storage channel, the third moving mechanism may drive the actuator to descend so as to place the sample holder in the engagement slot or the storage channel.

Figure 7:
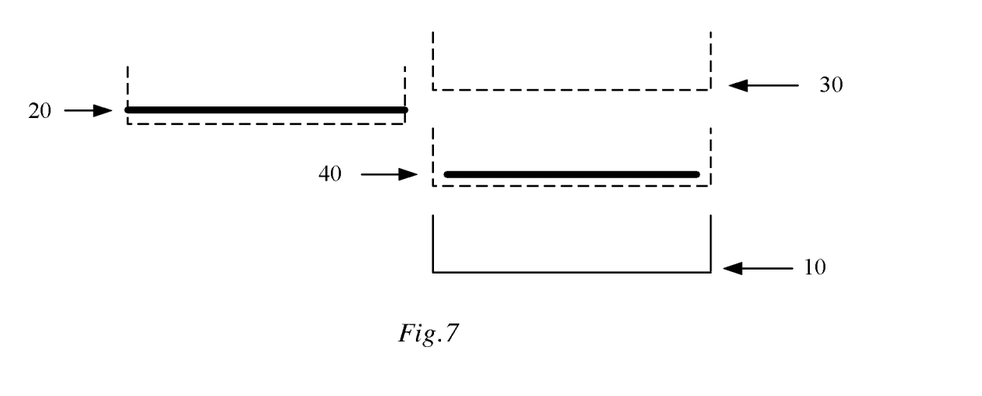
FIG. 7 is a schematic diagram of the ascending and descending height of an actuation mechanism.
Figure 8:
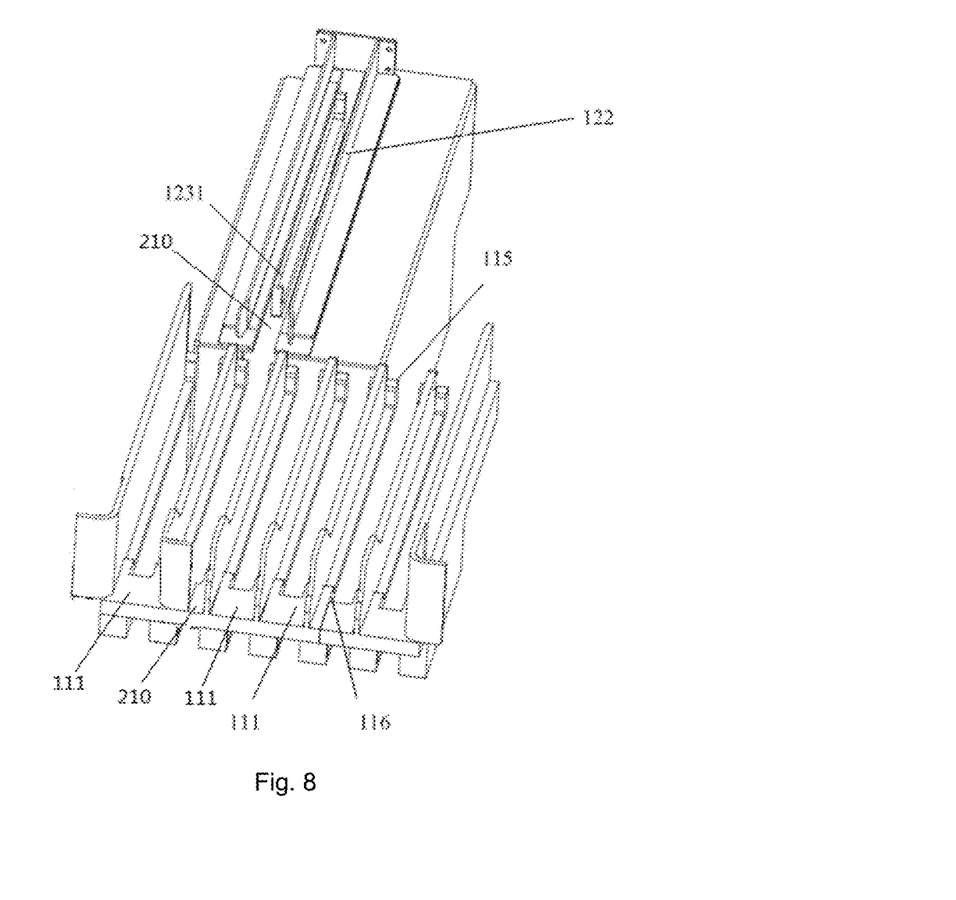
FIG. 8 is a schematic diagram of a sample-drawing channel and a plurality of storage channels.

In conjunction with FIGS. 6 and 7, a dispatching process of the sample holders in this embodiment is described as follows.

The sample holder may move along a path 1. The first moving mechanism may move along the X direction, so that the engagement slot 122 aligns with the predetermined storage channel 111. The actuator may move towards the sample holder in the storage channel along the Y direction at a height position 10. After the actuator aligns with the sample holder, the actuator may move upwards, and at the same time, the sample holder may be raised to a height position 30. Then, the actuator may move towards the engagement slot 122 (as shown by bold dotted lines in FIG. 6) in the reverse direction, such that the sample holder may be moved to an initial position 123 (as shown by fine dotted lines in FIG. 6) of the sample holder in the engagement slot. Thereafter, the actuator may descend to a height position 20, which height position 20 may be also the height of the bottom of the engagement slot, such that the sample holder may be placed in the initial position 123 of the sample holder in the engagement slot. In order to facilitate description, it may be assumed that the sample holder is provided with 10 sample positions, and the serial number is No. 1, No. 2, . . . , No. 10 from top to bottom successively.

The sample holder may move along a path 2. The first moving mechanism may drive the engagement slot in which the sample holder may be placed to move along the X direction so as to enter the sample-drawing channel, and meanwhile, the last sample (for example, a No. 10 sample) in the sample holder may be close to a position where the bar code scanner is located.

The sample holder may move along a path 3. The actuation mechanism may push the sample holder at the height position 20 to align a sample holder bar code with the scanning window so as to perform the sample holder bar code scanning operation. Thereafter, the actuation mechanism continues to push the sample holder to move out of the engagement slot, so that the samples on the sample holder successively advance according to tube positions, such that the tube positions of No. 10 to No. 1 samples are successively aligned with the scanning window to complete the scanning of the bar code of the sample holder and the bar codes of the 10 sample tube positions.

The sample holder may move along a path 4. The actuation mechanism may push the sample holder to move in the reverse direction, so that the sample holder may move towards the engagement slot. Initially, the No. 1 sample to be tested stops at the sample-drawing position, and at the same time, the sample dispensing needle may move to the sample-drawing position to draw the sample. Then the actuator continues to push the sample holder, such that the sample holder gradually may move into the engagement slot; and at the same time, a plurality of samples on the sample holder successively advance according to tube positions, and respectively stop at the sample-drawing position to allow for sample drawing, until the No. 10 sample completes sample-drawing, and then the sample holder completely moves into the engagement slot.

The sample holder may move along a path 5. The first moving mechanism may move along the X direction, so that the engagement slot aligns with the predetermined storage channel.

The sample holder may move along a path 6. The actuation mechanism may ascend from the height position 20 to the height position 30 and raise the sample holder, the actuation mechanism may move along the Y direction to transfer the sample holder to a position above the storage channel, the actuation mechanism may descend to the height position 10, and during the descending process, the sample holder may be placed at a height position 40 of the bottom of the storage channel.

In other embodiments, the stop member may not be fixed, and may be movable instead. When the actuation mechanism and/or the sample holder pass(es) through, the stop member may be opened so as to allow the actuation mechanism and/or the sample holder to pass through; and at other times, the stop member may be closed to prevent the sample holder in the storage channel from protruding out of the storage channel.

As will be appreciated by one of ordinary skill in the art, principles of the present disclosure may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The invention claimed is:

1. A sample analyzer, comprising:
    a sample storage region, the sample storage region being provided with a plurality of storage channels arranged side-by-side for receiving sample holders, each sample holder being capable of receiving a plurality of sample containers;
    a transport mechanism, comprising an engagement slot for receiving one of the sample holders, an actuation mechanism, and a first moving mechanism for driving the engagement slot and the actuation mechanism to move along a first direction, wherein the first direction is a horizontal direction perpendicular to an axial direction of the storage channels, the engagement slot and the actuation mechanism are fixed on the first moving mechanism, an axial direction of the engagement slot is parallel to the axial direction of the storage channels, the engagement slot and the actuation mechanism are alignable with any one of the storage channels by means of the first moving mechanism moving along the first direction, wherein the actuation mechanism comprises an actuator for pushing or pulling the sample holder and a second moving mechanism for driving the actuator to move along a second direction parallel to the axial direction of the storage channel, and the actuator is drivable by at least one of the first moving mechanism and the second moving mechanism to realize movement of the sample holder between the storage channels and the engagement slot, wherein the actuation mechanism further comprises a third moving mechanism for driving the actuator to ascend and descend, wherein the actuator comprises a cross arm and two vertical arms arranged on two sides of the cross arm, the actuator is capable of being moved to bottom of the sample holder under the drive of the second moving mechanism, the third moving mechanism is arranged to drive the actuator to ascend such that the cross arm abuts against the bottom of the sample holder, and the two vertical arms contact, during movement, with two sides of the bottom of the sample holder such that the actuator pushes or pulls the sample holder under the drive of the second moving mechanism; and
    a sample-drawing channel, which is arranged in parallel with the axial direction of the storage channels, wherein, when the engagement slot is aligned with the sample-drawing channel, the sample-drawing channel accommodates the sample holder received by the engagement slot and provides a space for said sample holder to move along an axial direction of the sample-drawing channel, wherein a sample-drawing position is provided along the axial direction of the sample-drawing channel; and
    a sample-drawing mechanism, which is capable of drawing a sample from each sample container received by said sample holder in the sample-drawing channel and moved to the sample-drawing position by the actuation mechanism.

2. The sample analyzer of claim 1, further comprising an information reader which is arranged in a transfer path along which the sample holder is taken from the storage channel to the sample-drawing position for sample drawing, and performs an information reading operation on the sample holder and one or more sample containers passing thereby.

3. The sample analyzer of claim 2, wherein the information reader is arranged in the sample-drawing channel.

4. The sample analyzer of claim 3, wherein, when the engagement slot is aligned with the sample-drawing channel, the second moving mechanism drives the actuator to move such that the actuator pushes the sample holder out of the engagement slot and towards the information reader along the sample-drawing channel; after all of the one or more sample containers on the sample holder have passed by the information reader, the second moving mechanism drives the actuator to move in a reverse direction, such that the actuator pushes the sample holder to move in the reverse direction, and the one or more sample containers on the sample holder successively pass through the sample-drawing position and make a stop at the sample-drawing position during sample drawing.

5. The sample analyzer of claim 4, wherein the information reader and the sample-drawing position are located at a middle section of the sample-drawing channel.

6. The sample analyzer of claim 2, wherein the information reader is arranged at an end of the engagement slot towards the storage channel, and reads sample information when the actuation mechanism drives the sample holder to move into the engagement slot.

7. The sample analyzer of claim 1, wherein the sample-drawing channel is arranged in a position which is adjacent to an outermost storage channel.

8. The sample analyzer of claim 1, wherein each of the storage channels is provided with stop members, the stop members being respectively arranged at two ends of each of the storage channels for stopping the sample holder received in the storage channel.

9. The sample analyzer of claim 8, wherein the stop members are steps respectively arranged at the two ends of each of the storage channels, a middle portion of each step is provided with an opening through which the actuator can pass; when one of the sample holders enters the storage channel from the engagement slot or enters the engagement slot from the storage channel, the third moving mechanism drives the actuator to ascend so as to raise the sample holder to pass through the step; and after the sample holder enters the engagement slot or the storage channel, the third moving mechanism drives the actuator to descend so as to place the sample holder in the engagement slot or the storage channel.

10. The sample analyzer of claim 1, wherein the third moving mechanism and the actuator are fixed together on the second moving mechanism and driven by the second moving mechanism to move forwards and backwards along the second direction.

11. The sample analyzer of claim 1, wherein the sample drawing mechanism has a sample dispensing needle and a moving mechanism capable of moving the sample dispensing needle to the sample-drawing position to execute a sample-drawing operation.

\* \* \* \* \*